(No Model.)

M. HERTWIG.
LIQUID COOLER.

No. 592,781. Patented Nov. 2, 1897.

Witnesses:
John Becker.
William Miller

Inventor:
Max Hertwig
by his attorneys
Roeder & Briesen

UNITED STATES PATENT OFFICE.

MAX HERTWIG, OF HOBOKEN, NEW JERSEY.

LIQUID-COOLER.

SPECIFICATION forming part of Letters Patent No. 592,781, dated November 2, 1897.

Application filed February 19, 1897. Serial No. 624,226. (No model.)

*To all whom it may concern:*

Be it known that I, MAX HERTWIG, of Hoboken, Hudson county, New Jersey, have invented an Improved Liquid-Cooler, of which the following is a specification.

This invention relates to a liquid-cooler more particularly designed for domestic use and by which beer, wine, or other beverages contained in bottles, bowls, or glasses may be kept cool for table-service.

Figure 1:
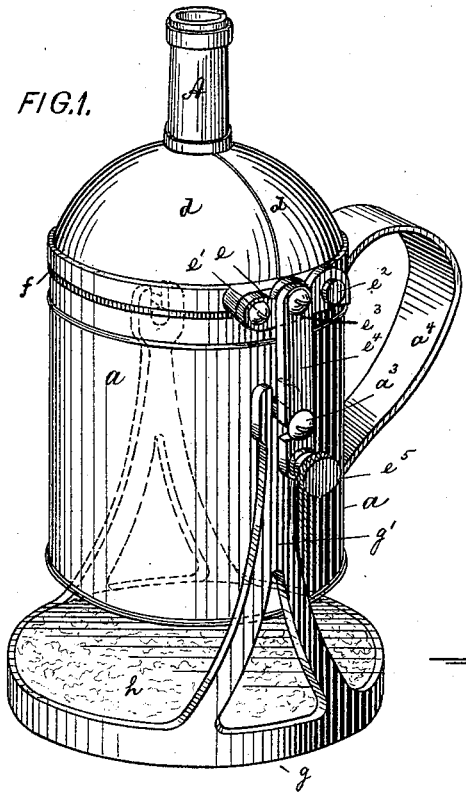
Figure 2:
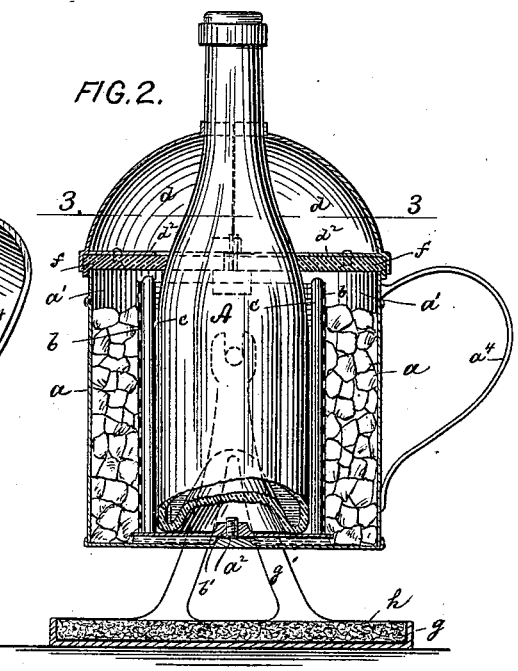
Figure 4:
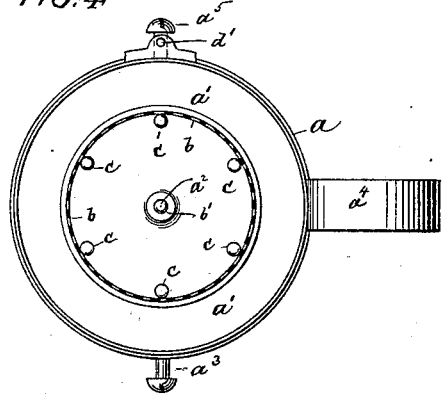
Figure 3:
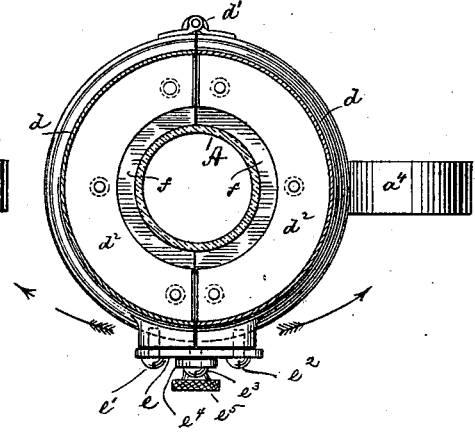

In the accompanying drawings, Figure 1 is a perspective view of my improved cooler; Fig. 2, a vertical central section thereof; Fig. 3, a horizontal section on line 3 3, Fig. 2; and Fig. 4 a top view with the stand and cover removed.

The letter $a$ represents the cylindrical shell or casing of the cooler, within which there is centered an open-work wire basket $b$, between which and the wall of the shell an annular chamber $a'$ for the reception of the chopped ice is formed. The basket $b$ is secured to the shell $a$ by means of a screw-stud $a^2$, that projects upwardly from the bottom of the shell and engages a tapped reinforced perforation $b'$ in the bottom of the basket, so that the basket may be readily removed for cleaning purposes.

Against the inner face of the basket $b$ there are placed a number of upright circumferentially-arranged ribs $c$, attached, preferably, to the bottom of the basket and between which the bottle or other receptacle A, that holds the liquid to be cooled, is adapted to be confined. These ribs prevent a direct contact between ice and the bottle A and form a cold-air chamber around the latter.

To the upper end of the shell $a$ there are hinged at $d'$ the two halves or sections $d$ of a divided laterally-opening cover. Each of these cover-sections is bulged, as shown, so as to inclose the main length of the bottle-neck, which projects outward through a central opening of the cover. The cover-sections $d$ are adapted to be locked firmly to each other and also to the shell $a$, when closed, by means of a hook $e$, hinged at $e'$ to one of the cover-sections and engaging a pin $e^2$ of the other cover-section.

To the body of the hook $e$ there is pivoted at $e^3$ a second hook $e^4$, that engages a pin $a^3$, projecting outwardly from the body of shell $a$. To open the cooler, the hook $e^4$ is first swung sidewise by a knob $e^5$ to unlock the cover from shell $a$, and then the hook $e$ is swung upward to disconnect the two sections of the cover from each other and permit them to be opened on hinge $d'$.

At a short distance above its lower end each cover-section $d$ is provided with a semiannular base-plate $d^2$, to the lower side of which there is riveted a semiannular flexible packing $f$, made, preferably, of rubber or similar material and designed to snugly embrace the neck of the bottle A. The packing $f$ forms an air-excluding cover for the ice-chamber $a'$ when the cooler is closed, and thus effectively protects the ice against rapid melting.

I prefer to provide the shell $a$ with a handle $a^4$ and with a trunnion $a^5$, placed diametrically opposite to pin $a^3$, which constitutes a second trunnion. These trunnions are hung into a pair of notched standards $g'$ of a stand $g$. The base-plate of this stand is dish-shaped and contains, preferably, an absorbent pad $h$ to catch the drippings. By means of this stand the cooler may be tilted in a convenient manner to discharge the contents of the bottle A.

It will be seen that in my improved cooler the ice is effectively protected against rapid melting and that, moreover, the bottle may be tilted while in the cooler to discharge its contents.

What I claim is—

A liquid-cooler composed of a shell, an inclosed basket, a bulged sectional lid having a divided annular base-plate, a packing secured thereto, a hook pivoted to one cover-section, a pin on the other cover-section adapted to be engaged thereby, a second hook pivoted to the body of the first hook, and a pin on the shell adapted to be engaged by said second hook, substantially as specified.

MAX HERTWIG.

Witnesses:
F. V. BRIESEN,
WILLIAM SCHULZ.